C. H. TUCKER.
EQUALIZING TRUCK FOR CRANE TROLLEYS.
APPLICATION FILED MAY 15, 1912.
1,050,499.
Patented Jan. 14, 1913.
3 SHEETS—SHEET 3.
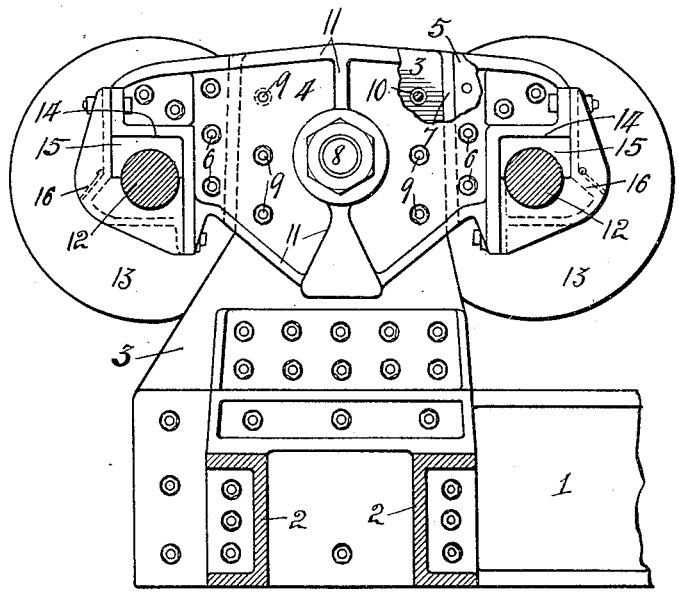
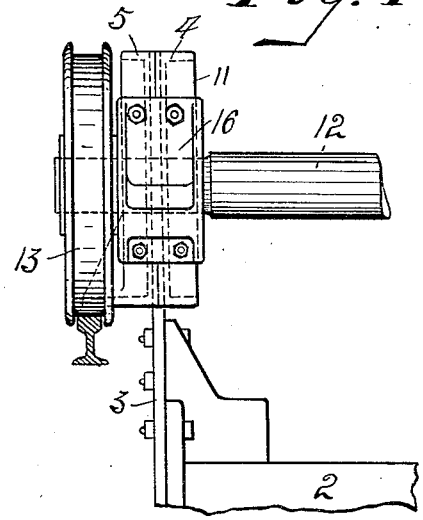
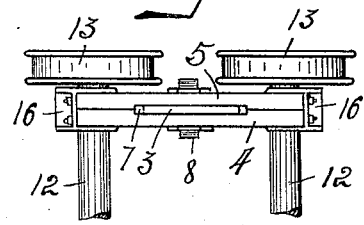
WITNESSES.
C. E. Walker.
E. H. Wills.
INVENTOR.
Charles H. Tucker,
By Owen & Owen,
His attys.

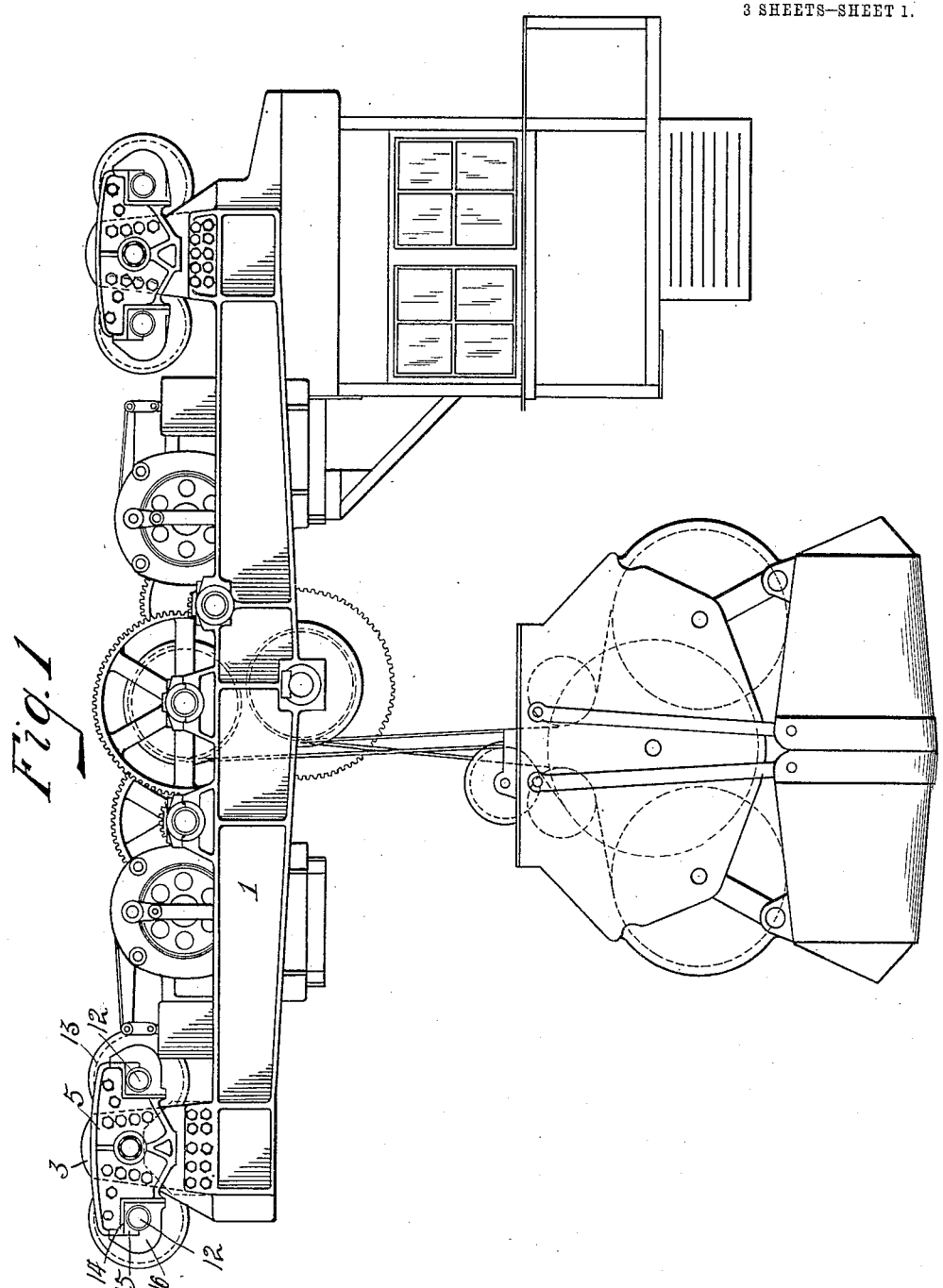

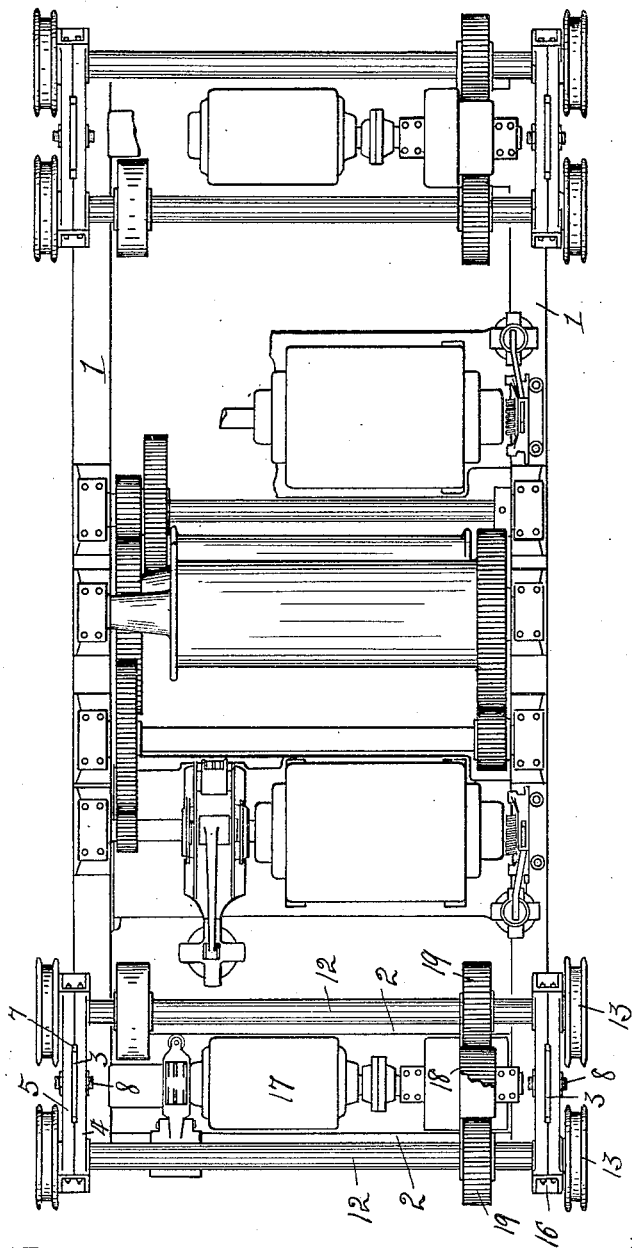

UNITED STATES PATENT OFFICE.

CHARLES H. TUCKER, OF TOLEDO, OHIO.

EQUALIZING-TRUCK FOR CRANE-TROLLEYS.

1,050,499.

Specification of Letters Patent. Patented Jan. 14, 1913.

Application filed May 15, 1912. Serial No. 697,564.

*To all whom it may concern:*

Be it known that I, CHARLES H. TUCKER, a citizen of the United States, and a resident of Toledo, in the county of Lucas and State of Ohio, have invented a certain new and useful Equalizing-Truck for Crane-Trolleys; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates particularly to crane trolleys of the underslung or suspended frame type, but is not restricted to such use, as it may be used for any purpose for which it may be adapted or appropriate.

The object of my invention is the provision, in a trolley of this character, of an equalizing truck which is simple and inexpensive of manufacture, strong and durable in its construction, and has the trolley frame suspended therefrom in such manner as to permit a free limited rocking of the trucks relative thereto, and which also obviates the use of the shock-absorbing springs customarily employed in connection with the trucks of trolleys of this class, thus enhancing the practicability and commercial value thereof.

The invention is fully described in the following specification and while, in its broader aspect, it is capable of embodiment in numerous forms, a preferred embodiment thereof is illustrated in the accompanying drawings, in which—

Figure 1 is a side elevation of a trolley embodying my invention, with the near truck wheels removed. Fig. 2 is a top plan thereof with portions broken away. Figs. 3 and 4 are different enlarged elevations of portions of a truck and the suspended trolley frame with parts broken away and in section, and Fig. 5 is a reduced top plan view of the end member of a truck with the truck axles and wheels attached thereto.

Referring to the drawings, 1, 1 designate the side beams, and 2 the cross-girts of a trolley frame of any suitable form and construction, which is provided, in the present instance, at the ends of the beams 1 with upstanding hanger-plates 3, which are pivotally suspended from the end beams or members of the trolley trucks, as shown.

Each of the end beams of the trucks comprises a pair of plates or members 4 and 5 of preferably substantially duplicate form, which are rigidly secured together at their end portions in laterally abutting relation by bolts 6, or in any other suitable manner. The inner sides of these plates are recessed in registering relation to form a centrally-disposed vertical socket 7 therebetween into which the upper end of an associated hanger-plate 3 is intended to fit. The hanger-plates 3 are pivotally hung from within the sockets 7 of the truck ends by short shafts 8, which extend across the central portions of such sockets through registering openings in the hanger-plates 3 and plates 4 and 5 of the truck ends. The sockets 7 of the truck ends are of greater breadth than the hanger-plates 3 to permit the truck ends to have equalizing rocking action relative thereto, with the shafts 8 as their rocking axes. The plates 4 and 5 of the truck-ends, in addition to being secured together by the bolts 6, are also preferably connected by bolts 9, which project through openings 10 in the plates 3, which openings are of greater diameter than the bolt shanks to enable the plates to rock relative thereto. The truck end plates 4 and 5 are preferably provided on their outer sides with strengthening webs or flanges 11, as shown.

The truck axles 12, which are two in number for each truck and carry the wheels 13 at their outer ends without the truck end members 4—5, are journaled adjacent to their ends in the opposite end portions of such members. In the present instance the ends of the members 4—5 are recessed at their lower portions to provide the overhanging shoulders 14 against which the bearing-blocks 15, which rest upon the axles, have their upward thrusts, as is apparent. The axles 12 are held to the blocks 15 by the L-shaped retaining boxes 16, which bolt at top and bottom to the respective portions of the ends of the members 4—5, as shown, and also form boxes for holding oiled waste or other lubricant.

It will be noted that the mounting of the truck ends 4—5 for pivotal equalizing movements relative to the hanger plates 3 of the trolley frame enables a motor 17, which is mounted on the cross-girts 2 of the frame below each truck, to have a single drive gear in mesh with opposing gears 19, 19 on the axles 12, 12 of the associated truck, providing, of course, the axis of the gear 18 is in axial alinement with the rocking axis of the truck ends. This feature in itself is of very great importance over the spring forms of equalizing trucks heretofore used, as it enables both axles to be driven from a common drive gear. In addition to this feature of advantage the mounting of the truck ends for pivotal equalizing movements, as shown, enables the trucks to have free tilting movements due to the wheels passing over obstructions or uneven places in the track over which they are traveling without throwing the weight of the trolley frame upon one or the other of the axles of a truck, as is the case with the frames of spring equalizing trucks heretofore used in apparatus of this class. Further advantages of this form of equalizing means for the trucks will be apparent to persons skilled in the art and familiar with the objections incident to the use of the forms of trucks heretofore used.

I wish it understood that my invention is not limited to any specific construction or arrangement of the parts except in so far as such limitations are specified in the claims.

Having thus described my invention, what I claim as new and desire to secure by Letters Patent, is,—

1. In combination, a truck having end members provided with vertical openings, and a trolley frame having parts projected upward therefrom into said openings and pivotally secured therein.

2. In combination, a truck having a pair of spaced parts coöperating to form a vertical opening, and a trolley frame having a hanger plate pivotally suspended from within said opening.

3. In combination, a plurality of trucks each having a pair of wheel carrying axles and end members connecting such axles, and a trolley-frame having hanger-plates projecting upwardly therefrom and pivoted to respective ones of the end members of said trucks midway between the axles thereof.

4. In combination, a trolley-frame having hanger members projecting upwardly therefrom, and trucks having vertically socketed end members into which respective ones of said hanger members project and are pivoted to permit pivotal equalizing movements of the trucks relative to the frame.

5. In combination, a truck having axle connecting end members provided with centrally-disposed vertical sockets, a frame having hanger plates projecting upwardly therefrom and into said sockets, and means connecting said members and hanger plates for relative pivotal movements.

6. In combination, a trolley-frame having hanger-plates projecting upwardly therefrom, a truck having axle connecting end members of multiple part construction, the parts of which coöperate to form a vertical socket into which said hanger-plates may project, and means for pivotally attaching said plates and members.

7. In combination, a truck having spaced axle connecting end members each of which is composed of a plurality of laterally-abutting rigidly-connected plates forming a vertical socket centrally between their ends, and a trolley frame having hanger plates projecting upwardly therefrom and loosely fitting within said sockets and attached to said truck end members for pivotal movements relative thereto.

8. In combination, a truck having its end members vertically socketed centrally of their ends and having the upper portions of their ends extended to form thrust shoulders, spaced axles having their end portions disposed under said shoulders, bearing blocks interposed between said axle and shoulders, axle retaining boxes fixed to the ends of said members and adapted to carry a lubricant for the axles, and a trolley-frame having hanger plates projecting upwardly into said sockets and pivoted to said end members.

9. In combination, a truck having end members each of which is composed of a pair of laterally-abutting plates which coöperate to form a central vertical socket, a trolley-frame having hanger-plates fixedly projecting upwardly therefrom and loosely fitting into said sockets, a shaft supporting each hanger-plate within its truck member socket for relative rocking movements, said shaft having its ends mounted in the plates of said members, and bolts rigidly securing the members together with a portion thereof loosely projected through said hanger plates.

In testimony whereof, I have hereunto signed my name to this specification in the presence of two subscribing witnesses.

CHARLES H. TUCKER.

Witnesses:
C. W. OWEN,
E. E. THOMAS.